United States Patent
Hess et al.

(10) Patent No.: US 10,496,419 B2
(45) Date of Patent: Dec. 3, 2019

(54) EDITING INHERITED CONFIGURATIONS

(71) Applicant: Apple Inc., Cupertino, CA (US)

(72) Inventors: Jonathan J Hess, Los Altos, CA (US); Kevin B. Cathey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 15/275,229

(22) Filed: Sep. 23, 2016

(65) Prior Publication Data

US 2017/0357424 A1 Dec. 14, 2017

Related U.S. Application Data

(60) Provisional application No. 62/348,194, filed on Jun. 10, 2016.

(51) Int. Cl.
*G06F 9/451* (2018.01)
*G06F 8/34* (2018.01)
*G06F 8/38* (2018.01)

(52) U.S. Cl.
CPC ............... *G06F 9/451* (2018.02); *G06F 8/34* (2013.01); *G06F 8/38* (2013.01)

(58) Field of Classification Search
CPC . G06F 9/451; G06F 17/50; G06F 8/38; G06F 8/34
See application file for complete search history.

(56) References Cited

U.S. PATENT DOCUMENTS

| | | | |
|---|---|---|---|
| 9,026,928 B2 | 5/2015 | Ferry et al. | |
| 9,176,746 B2* | 11/2015 | Kothari | G06F 9/451 |
| 9,275,167 B2 | 3/2016 | Melnyk et al. | |
| 9,397,844 B2 | 7/2016 | Howard et al. | |
| 10,120,659 B2* | 11/2018 | Cathey | G06F 8/38 |
| 2006/0225037 A1* | 10/2006 | Glein | G06F 8/38 |
| | | | 717/117 |
| 2008/0307341 A1* | 12/2008 | Ferry | G06F 3/04817 |
| | | | 715/764 |
| 2010/0251134 A1* | 9/2010 | Van Seggelen | G01C 21/26 |
| | | | 715/744 |

(Continued)

*Primary Examiner* — Andrew T Chiusano
(74) *Attorney, Agent, or Firm* — Womble Bond Dickinson (US) LLP

(57) ABSTRACT

Embodiments provide techniques for creating an adaptive user interface for an electronic device. In one embodiment the instructions configure one or more processors to perform operations including displaying, in an application development environment, a user interface of a graphical representation of the electronic device, the graphical representation associated with one or more configurations, each configuration including a set of properties; while displaying the graphical representation of the electronic device, receiving a value for a first property; in response to receiving the value for a first property, determining that the graphical representation of the electronic device is associated with a first configuration; creating a first sub-configuration of the first configuration, the first sub-configuration inheriting one or more properties in the set of properties from the first configuration; applying the value for the first property to the first sub-configuration; and updating the user interface of the graphical representation of the electronic device.

23 Claims, 15 Drawing Sheets

(56) References Cited

U.S. PATENT DOCUMENTS

| | | | |
|---|---|---|---|
| 2012/0096344 A1* | 4/2012 | Ho | G06F 17/211 |
| | | | 715/249 |
| 2013/0205277 A1* | 8/2013 | Seven | G06F 8/38 |
| | | | 717/121 |
| 2013/0332826 A1 | 12/2013 | Karunamuni | |
| 2013/0339907 A1* | 12/2013 | Matas | G06T 11/60 |
| | | | 715/853 |
| 2014/0035945 A1* | 2/2014 | Anglin | G06F 3/14 |
| | | | 345/619 |
| 2014/0059424 A1 | 2/2014 | Kim et al. | |
| 2014/0282055 A1 | 9/2014 | Engel et al. | |
| 2014/0365895 A1* | 12/2014 | Magahern | G06F 3/016 |
| | | | 715/727 |
| 2015/0277840 A1* | 10/2015 | Ninan | G06F 3/1423 |
| | | | 345/589 |
| 2015/0347097 A1* | 12/2015 | Cathey | G06F 8/38 |
| | | | 715/763 |
| 2015/0363371 A1 | 12/2015 | Sadouski et al. | |
| 2016/0132301 A1* | 5/2016 | Riscutia | G06F 3/0483 |
| | | | 715/763 |
| 2016/0209994 A1* | 7/2016 | Kaufthal | G06F 8/38 |

\* cited by examiner

700

```
┌─────────────────────────────────────────────────────────────────┐
│ receive a user interface by an application development          │
│ environment configured to enabling authoring of a user          │
│ interface that adapts to a configuration associated with the    │
│ electronic device, the configuration including a set of         │
│ properties used to adapt the user interface                     │
│ 702                                                             │
└─────────────────────────────────────────────────────────────────┘
                                │
                                ▼
┌─────────────────────────────────────────────────────────────────┐
│ display a user interface on a graphical representation of the   │
│ electronic device, the graphical representation associated      │
│ with one or more configurations                                 │
│ 704                                                             │
└─────────────────────────────────────────────────────────────────┘
                                │
                                ▼
┌─────────────────────────────────────────────────────────────────┐
│ receive an indication to branch a first configuration           │
│ associated with the graphical representation, the indication    │
│ identifying a property of the first configuration to be         │
│ customized                                                      │
│ 706                                                             │
└─────────────────────────────────────────────────────────────────┘
                                │
                                ▼
┌─────────────────────────────────────────────────────────────────┐
│ create a first sub-configuration of the first configuration,    │
│ the first sub-configuration inheriting one or more properties   │
│ in the set of properties from the first configuration           │
│ 708                                                             │
└─────────────────────────────────────────────────────────────────┘
                                │
                                ▼
┌─────────────────────────────────────────────────────────────────┐
│ receive a value for the property of the first configuration     │
│ to be customized                                                │
│ 710                                                             │
└─────────────────────────────────────────────────────────────────┘
                                │
                                ▼
┌─────────────────────────────────────────────────────────────────┐
│ apply the value for the property to the first sub-configuration │
│ 712                                                             │
└─────────────────────────────────────────────────────────────────┘
                                │
                                ▼
┌─────────────────────────────────────────────────────────────────┐
│ update the user interface of the graphical representation of    │
│ the electronic device                                           │
│ 714                                                             │
└─────────────────────────────────────────────────────────────────┘
```

```
receive a user interface by an application development environment, the
application development environment enabling authoring of a user interface
that adapts to a configuration associated with the electronic device, the
configuration including a set of properties used to adapt the user interface
802
```

```
create an application including the user interface wherein the application is
configured to determine the configuration associated with a electronic device,
adapt the user interface according to the set of properties included in the
configuration, and display the adapted user interface on the electronic device.
804
```

FIG. 8

EDITING INHERITED CONFIGURATIONS

CROSS-REFERENCE

The present application is a non-provisional application claiming the benefit of U.S. Provisional Application No. 62/348,194 filed on Jun. 10, 2016, which is hereby incorporated herein by reference.

BACKGROUND OF THE DISCLOSURE

Current application development tools may require a developer to design separate user interfaces for each orientation of each physical screen size that an application can be displayed on. For example, if a developer wants to create an application that can be displayed on a first smartphone device, a second smartphone device, a first mobile tablet device, and a second mobile tablet device, the developer may be required to create four separate user interface flows for each orientation of each device. Then if the developer later wants to introduce changes to the user interface across all devices, the developer must manually and separately apply the changes to each of the user interface workflows.

One implementation of a development environment enables an adaptive user interface by providing abstracted size class values that enable a developer to define user interfaces that adapt to abstracted dimensional components. While abstracted size classes can be used to enable adaptive user interfaces, the abstracted size classes may not have a concrete connection with actual devices on which the user interface is to appear.

SUMMARY OF THE DESCRIPTION

Embodiments described herein provide techniques for creating an adaptive user interface for an electronic device. One embodiment provides for a non-transitory machine readable medium storing instructions to configure one or more processors to perform operations including displaying, in an application development environment, a user interface of a graphical representation of the electronic device, the graphical representation associated with one or more configurations, each configuration including a set of properties; while displaying the graphical representation of the electronic device, receiving a value for a first property; in response to receiving the value for a first property, determining that the graphical representation of the electronic device is associated with a first configuration; creating a first sub-configuration of the first configuration, the first sub-configuration inheriting one or more properties in the set of properties from the first configuration; applying the value for the first property to the first sub-configuration; and updating the user interface of the graphical representation of the electronic device.

A further embodiment provides for a a non-transitory machine readable medium storing instructions to cause one or more processors to perform operations to create an adaptive user interface for an electronic device. The operations include receiving a user interface by an application development environment, the application development environment enabling authoring of a user interface that adapts to a configuration associated with the electronic device, the configuration including a set of properties used to adapt the user interface; displaying the user interface on a graphical representation of the electronic device, the graphical representation associated with one or more configurations; receiving an indication to branch a first configuration associated with the graphical representation, the indication identifying a property of the first configuration to be customized; creating a sub-configuration of the first configuration, the sub-configuration inheriting one or more properties in the set of properties from the first configuration; receiving a value for the property of the first configuration to be customized; applying the value for the property to the first sub-configuration; and updating the user interface of the graphical representation of the electronic device.

A further embodiment provides for a data processing system comprising one or more non-transitory machine-readable media to store instructions and one or more processors to execute the instructions. In one embodiment the instructions cause the one or more processors to receive a user interface by an application development environment, the application development environment to enable authoring of a user interface that adapts to a configuration associated with an electronic device, the configuration including a set of properties used to adapt the user interface and create an application including the user interface. The application including the user interface is configured to determine the configuration associated with an electronic device, adapt the user interface according to the set of properties included in the configuration, and display an adapted user interface on the electronic device.

Other features of the present invention will be apparent from the accompanying drawings and from the detailed description, which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which:

FIG. 7 is flow diagram of additional adaptive user interface development logic, according to an embodiment;

FIG. 8 is flow diagram of adaptive user interface logic, according to an embodiment;

DETAILED DESCRIPTION

Various embodiments and aspects of a development environment for developing an adaptive user interface for an application configured to execute on an electronic device. It is to be noted that the following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2016 Apple Inc.

Figure 1A:
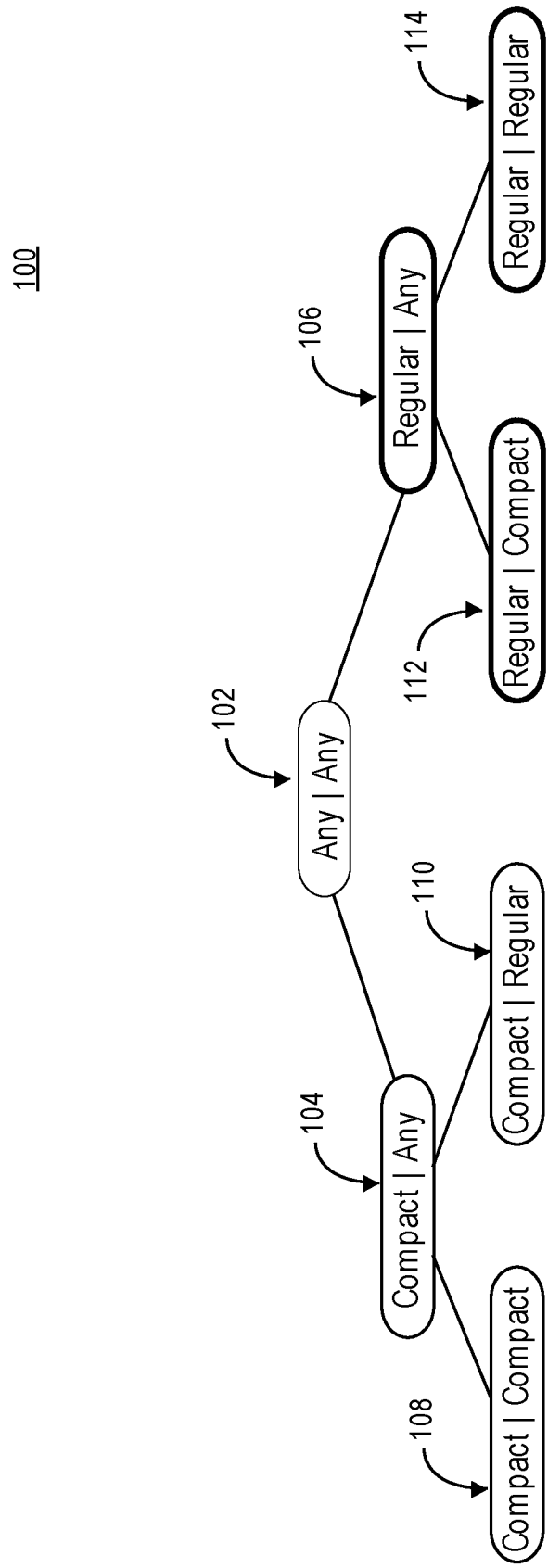
FIGS. 1A-1B are illustrations of user interface configuration inheritance, according to embodiments.
Figure 1B:
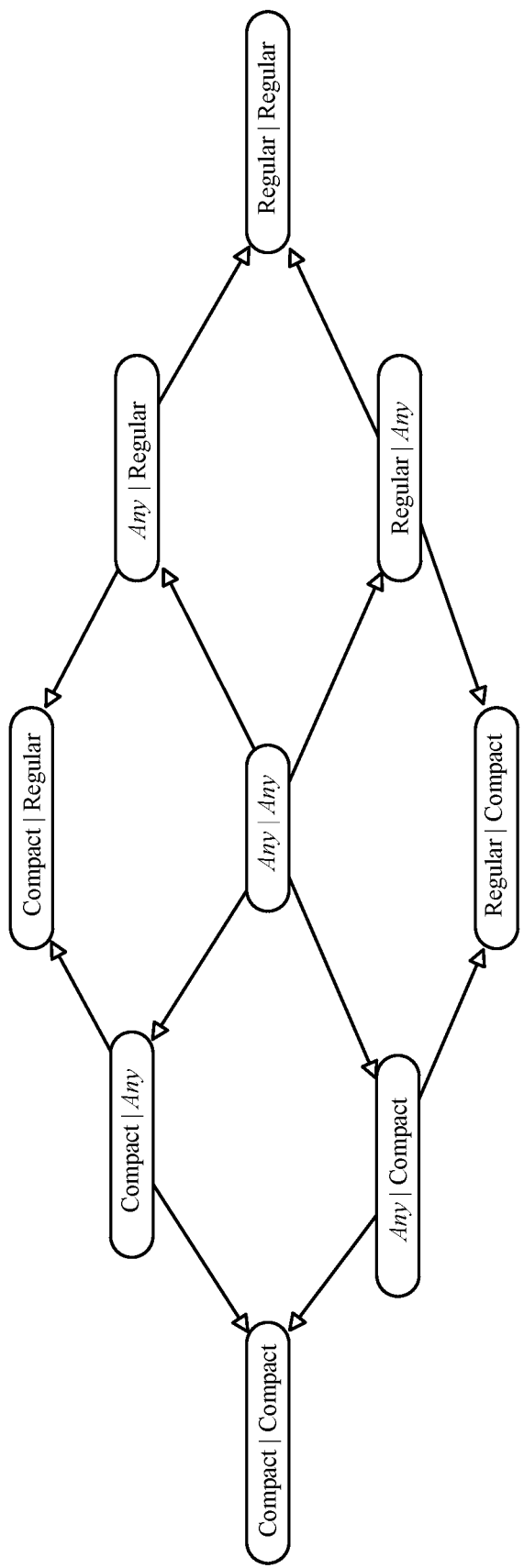

FIGS. 1A-1B are exemplary illustration of user interface configuration inheritance 100, 120, according to embodiments.

FIG. 1A is an illustration of user interface configuration inheritance 100, according to an embodiment. In one embodiment a user interface for an application can be configured such that multiple properties associated with the user interface can adapt based on a hierarchical set of configurations. Various properties for a user interface can be defined and associated with a configuration. Configurations can be interrelated such that child configurations can be defined in which one or more characteristics of the configuration can be changed without impacting other characteristics of the configuration.

Size class configuration is illustrated as an example user interface configuration inheritance 100. However, size class is but one example of hierarchical configurations that may be defined for an adaptive user interface. Size classes are traits assigned to user interface elements such as scenes or views. The size class can be used to abstract the sizes associated with a specific device type, device size, and device orientation to describe a look and feel (e.g., experience) associated with a given user interface for an application. In one embodiment, a user interface can have a compact experience or a regular and unconstrained experience for each device orientation. A user interface developer can customize an application's layout based on a defined size class for a user interface to customize the interface experience. The layout can then automatically adapt at runtime as the size class changes between different display devices and different display device orientations.

For example, the size class associated with a user interface enables a developer to specify width and height combinations to design for mobile electronic devices of different sizes and orientations. The size classes enable definition of abstract configurations of user interfaces that are separate from the user interface as presented on a concrete device. A developer can specify data for a parent size class (Any|Any) 102, and also specify data for child size classes of the parent class {(Compact|Any) 104, (Regular|Any) 106, (Compact|Compact) 108, (Compact|Regular) 110, (Regular|Compact) 112, (Regular|Regular) 114}.

The size classes can define categories that can store size information for a user interface of an application, and enables the development of adaptable user interfaces without requiring a developer to define redundant information for every type or size of device on which the user interface will be displayed. For example, a user interface can be defined for a baseline size class of (Any|Any) 102, which specifies an application user interface configuration defined to be displayed on a device having a display of any width and any height. A child size class of (Compact|Any) 104 can be associated with the same application user interface and store a user interface size classification to display the user interface on a device having a display of compact width. For a display of compact width, user interface properties such as the position of user interface elements on the screen or a font size of text of the user interface can be adjusted.

The (Compact|Compact) 108 size class, as well as (Compact|Regular) 110, (Regular|Compact) 112, and (Regular|Regular) 114 size classes define final size classes that can be used to define the user interface that is actually displayed on a device. The (*|Any) and (Any|*) size classes are abstract size classes that represent two or more final size classes. For example, interface items installed in the (Compact|Any) 104 size class appear in both the (Compact|Compact) 108 and (Compact|Regular) 110 size views of an application user interface. The (Compact|Any) 104 size class is a more specific definition of user interface size relative to (Any|Any) 102, such that any modifications performed in (Compact|Any) 104 can override a property defined for the (Any|Any) 102 size class, while inheriting unmodified properties from the (Any|Any) 102 size class. Likewise, modifications made in the (Compact|Compact) 108 size class may override properties or constraints that can override any user interface height specifications defined in (Compact|Any) 104, including those inherited from (Any|Any) 102.

However, prior implementations of user interface development environments did not specify a clear relationship between abstract size classes and concrete device interfaces. Accordingly, it may not be clear to a developer which actual concrete device is specified by a given abstract size class, or how to edit a parameter or constraint for a user interface for a specific concrete device.

Embodiments described herein enable a fusion of presentation and specification that enables a user interface developer to specify a user interface on a concrete presentation of an electronic device while avoiding complications presented by enabling a straightforward edit of a fully specified user interface configuration for a device. Using hierarchical and abstract configurations enables developers to specify general values associated with user interface views, controls, constraints, attributes, etc., such that inheritance between classes can enable an adaptive user interface, without requiring every combination of device types (e.g., tablet or smartphone), device sizes (large, medium, or small), and device orientation (e.g., portrait or landscape). However, to provide a more specific representation of the final user interface, embodiments provide a developer with a concrete representation of the user interface as displayed on devices of different types, sizes, and orientations, while automatically storing specifications and edits in the appropriate abstract configuration.

The user interface configuration inheritance 100 of FIG. 1A is exemplary and other inheritance flows and hierarchies may be used. For example, one embodiment can use the user interface configuration inheritance 120 of FIG. 1B, which is a more complex meshing of abstract configurations than the inheritance hierarchy of FIG. 1A.

Figure 2A:
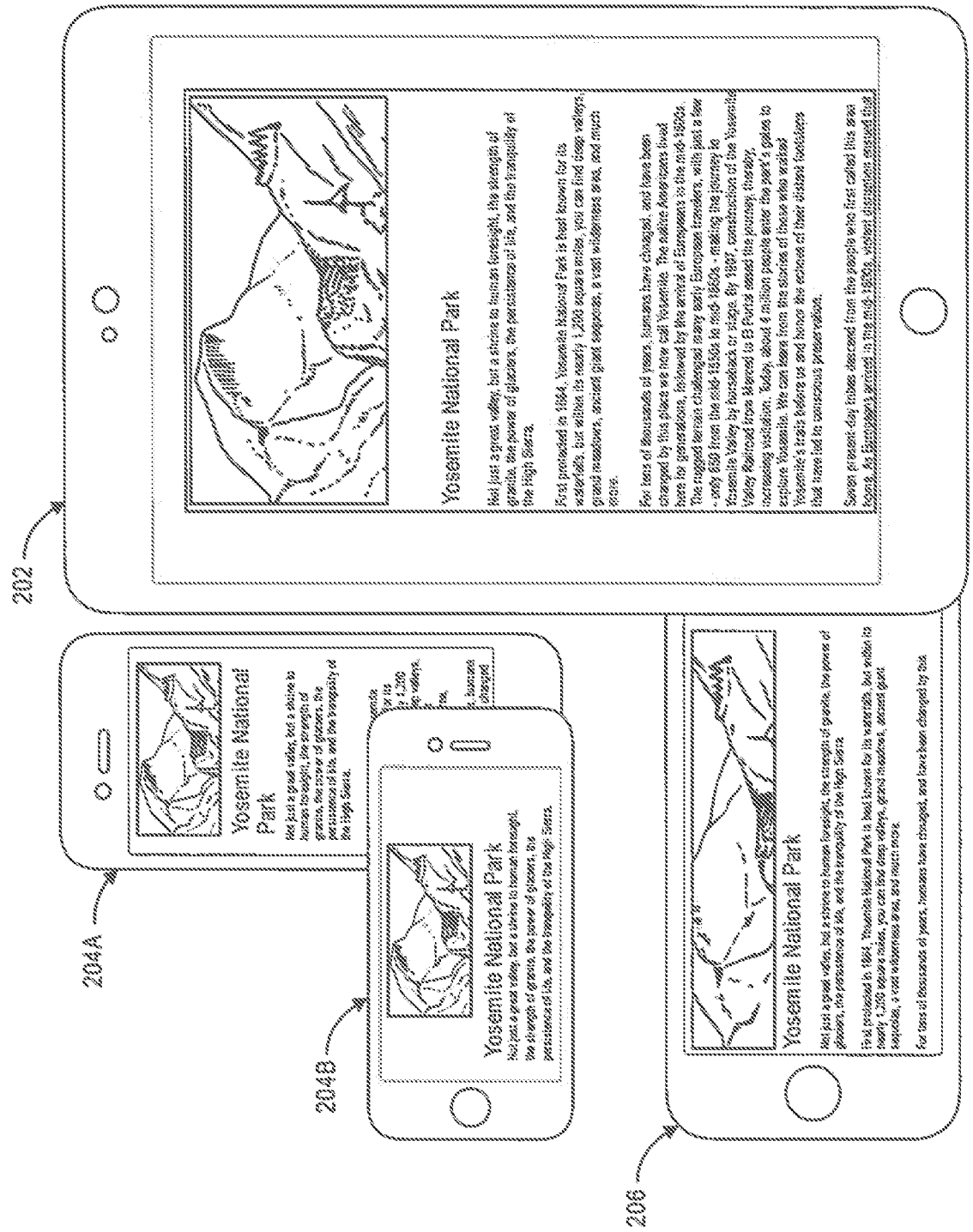
FIGS. 2A-2B illustrates example concrete user interface representations and size classes, according to embodiments.
Figure 2B:
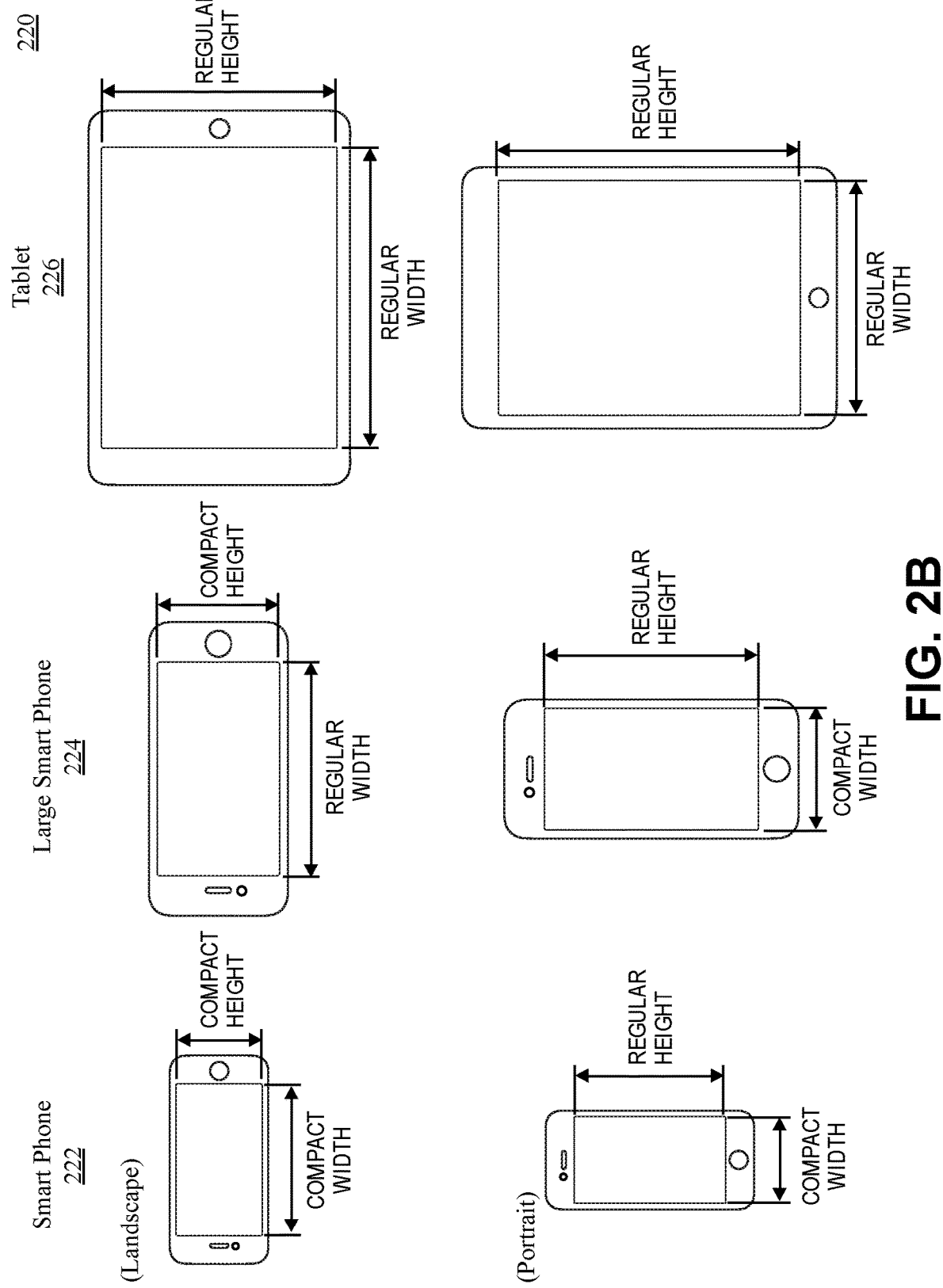

FIGS. 2A-2B illustrate exemplary concrete user interface representations 210 and associated exemplary size classes 220, according to embodiments. FIG. 2A illustrates example concrete user interface representations 200, according to an embodiment. A user interfaces displayed on an electronic device can include various fields such as text and graphics elements. The concrete user interface representations 200 enable a developer to edit properties (e.g., user interface controls, constraints, attributes, etc.) associated with an actual device, while storing the properties to the appropriate abstract classifications.

For example, a concrete representation of a tablet device 202, as well as smartphone devices, such as a smartphone 204 (e.g., smartphone 204A, smartphone 204B), a different size smartphone 206, as well as devices in different orientations (e.g., smartphone 204A in portrait, smartphone 204B in landscape). The devices illustrated are exemplary and not limited, and concrete representations of device interfaces can be shown for any type, size, and/or orientation. Additionally, while the devices illustrated are devices provided by Apple Inc. of Cupertino Calif., embodiments are not limited to user interface development for such devices.

In one embodiment, each concrete representation of a device can be mapped to a size class, such that configurations defined for a specific device will be associated with a specific size class by default. An exemplary mapping between devices and size classes is shown in Table 1 below.

TABLE 1

Exemplary Device to Size Class Mapping

| Device/Orientation | Size Class (Width\|Height) |
| --- | --- |
| Smartphone/Portrait | Any\|Any |
| Smartphone/Landscape | Any\|Compact |
| Large Tablet/Portrait | Any\|Regular |
| Small Smartphone/Portrait | Compact\|Any |
| Small Smartphone/Landscape | Compact\|Compact |
| Large Smartphone/Portrait | Compact\|Regular |
| Tablet/Landscape | Regular\|Any |
| Large Smartphone/Landscape | Regular\|Compact |
| Tablet/Portrait | Regular\|Regular |

The device to size class mapping displayed in Table 1 is exemplary and not limiting as to the total combination of size classes or devices, and is not limiting as to all embodiments. In one embodiment, each device and orientation is associated with a specific final size class (e.g., Regular|Regular), (Regular|Compact) etc. that is used to define the user interface that is actually displayed on a device. An additional mapping between concrete user interface representations and exemplary size classes 220 is shown in FIG. 2B.

FIG. 2B illustrates exemplary size classes 220 for a smart phone 222 a large smart phone 224, and a tablet 226. For the illustrated size classes, a smart phone 222 has a compact width and compact height while in landscape orientation, but a regular height in portrait orientation. A large smart phone 224 having larger width and height dimensions relative to the smart phone 222 has a compact height and a regular width while in landscape orientation and a regular height and compact width while in portrait orientation. A tablet 226 having a larger width and height dimension relative to the large smart phone 224 has regular width and regular height in both landscape and portrait orientation.

In one embodiment, the exemplary size classes illustrated can be used to enable a developer can edit constraints placed on an adaptive user interface while viewing a concrete representation of the user interface in a development interface. Edits to the user interface can then be associated with size class which is currently represented. In one embodiment, a developer can enter a configuration branch mode when editing properties of a user interface. In branch mode, a new sub-configuration of the current configuration can be created or edited, where the sub-configuration applies only to the edited properties. Thus, instead of using a single configuration hierarchy for the entire user interface, separate configuration hierarchies can be created for multiple properties of the user interface.

Figure 3:
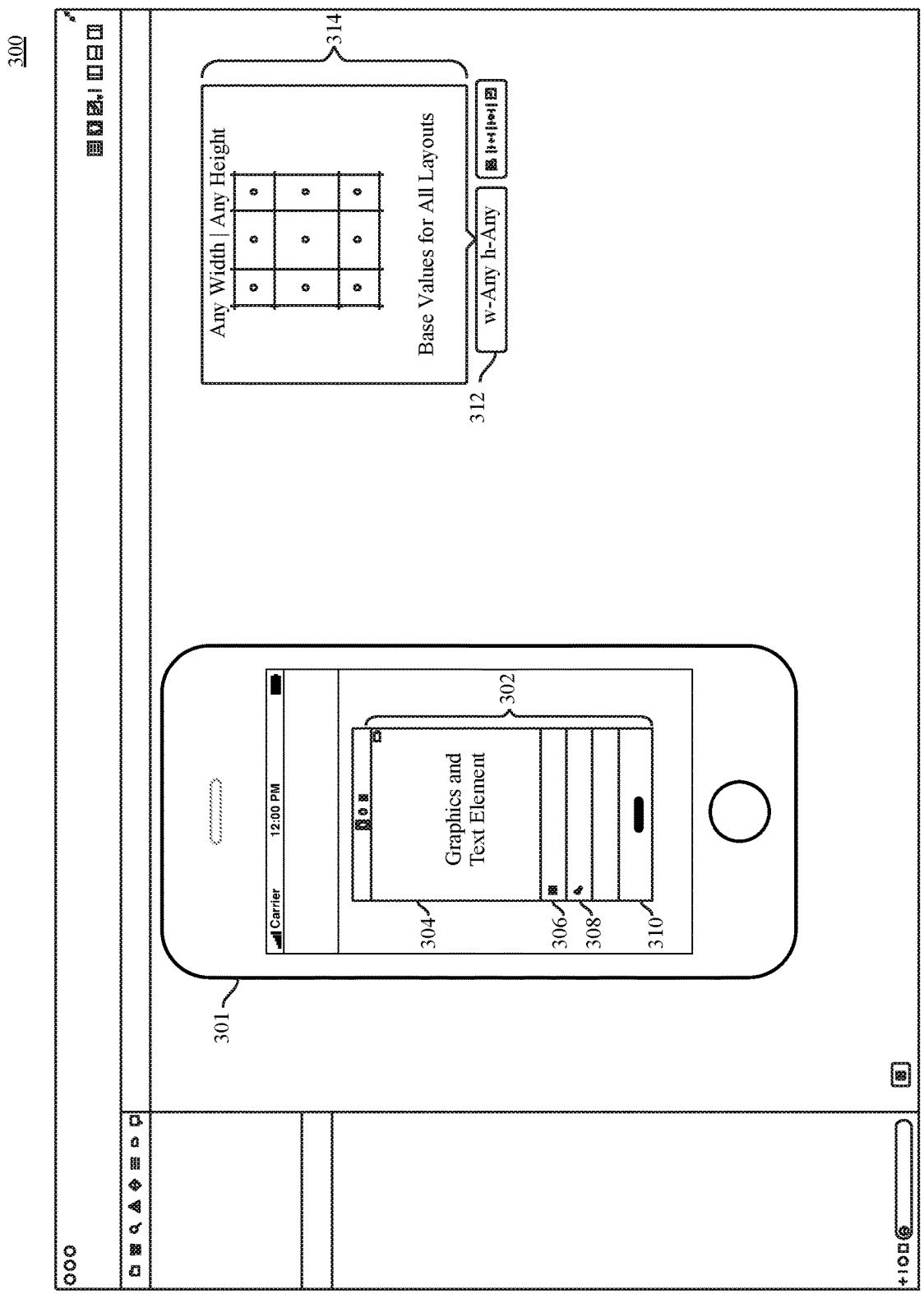
FIG. 3 is an illustration of a development interface, according to an embodiment.

FIG. 3 is an illustration of a development interface 300, according to an embodiment. The development interface can be used to display a concrete device representation 301 of a specified device. The concrete interface 301 can be mapped to an abstract size class 312. In one embodiment the abstract size class 312 is stored internally and not displayed to the user. In one embodiment, an abstract size class representation 314 can be displayed to the interface developer.

The illustrated development interface 300 displays a concrete representation 301 of a smartphone device in a portrait orientation, which in one embodiment correlates with the (Any|Any) configuration shown as the abstract size class 312. The exemplary user interface 302 illustrated includes a text and graphics element 304, a login entry element 306, password entry element 308, and an entry submission element 310. Properties for the user interface elements can be defined for the concrete representation and those properties can be associated with the abstract size class 312 associated with the concrete representation.

The development interface 300 can enable a developer to change the concrete representation 301 to a different device or orientation and the user interface 302 can be configured to adapt to the new device or orientation. The adapted user interface can then be displayed to the developer. The adaptation of the user interface can be edited to customize the manner in which the user interface 302 is displayed. Instead of changing the abstract size class 312 as in prior implementations of the development interface, the development interface 300 provided by embodiments described herein are configured to allows a developer to graphically select a different concrete representation 301 to display and the abstract size class 312 can be adapted to for the selected device used for the concrete representation 301. The user interface 302 can then be rendered differently according to the screen dimensions of a device selected as the concrete representation 301. Thus, developers are enabled to configure a user interface that represents the actual user interface that will be displayed on a user's device, instead of displaying the user interface based on associated abstracted size classes. The proper abstracted size classes in which the user interface properties are to be stores can be automatically selected by the development interface 300.

Figure 4:
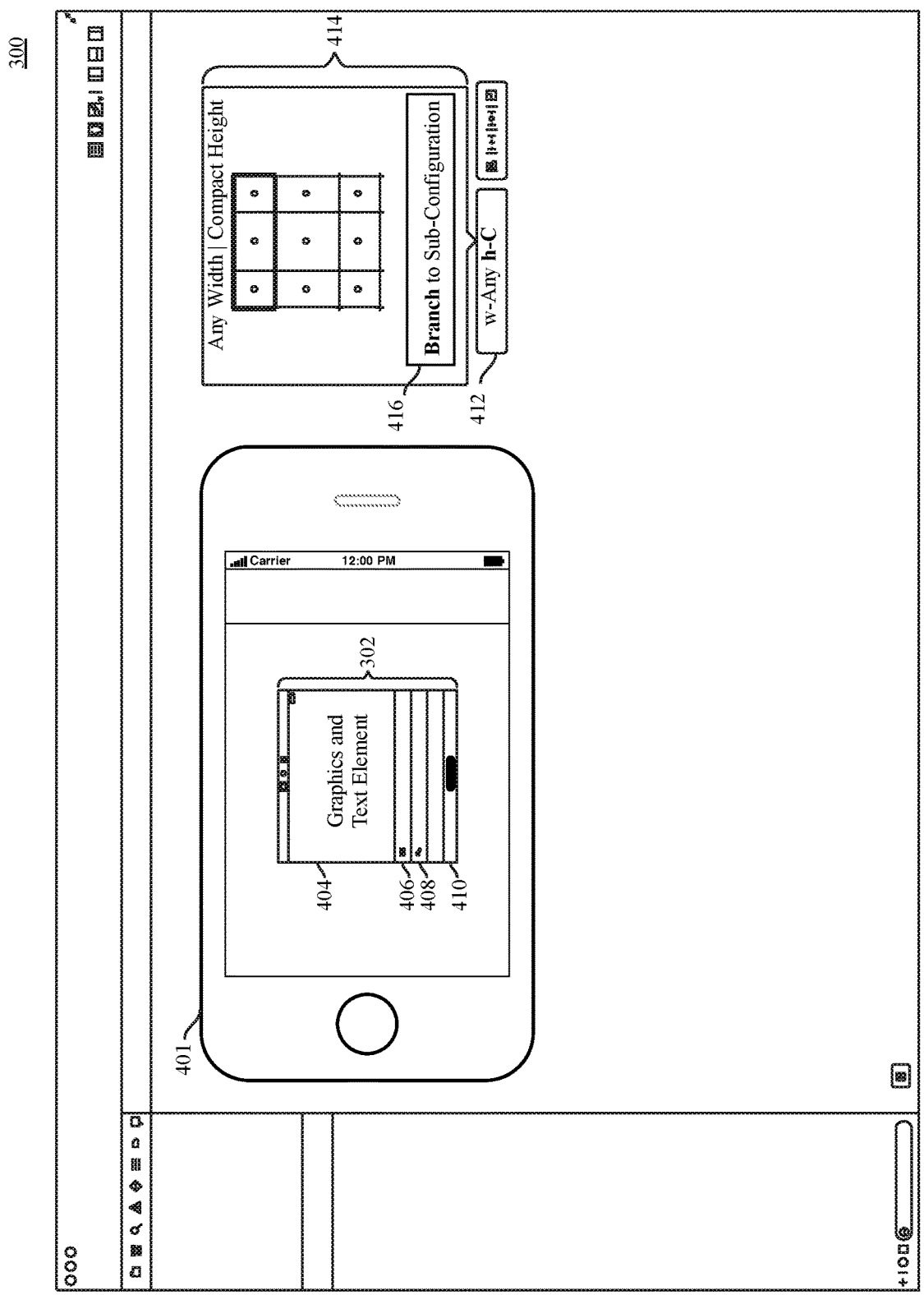
FIG. 4 is an illustration of the development interface in which a different concrete representation is displayed.

FIG. 4 is an illustration of the development interface 300 in which a different concrete representation 401 is displayed. In one embodiment, changing to the different concrete representation 401 can also change the abstract size class 412 for which edits to the user interface are applied. The user interface 302 can be adapted with new properties, to create a new text and graphics element 404, login entry element 406, password entry element 408, a entry submission element 410, or any other element defined for the user interface 302. The edited properties for these elements can be stored in a new collection of properties associated with the different concrete representation, which in the example of FIG. 4, is the (Any|Compact) abstract size class 412. In one embodiment, an updated abstract size class representation 414 can be displayed for the new abstract size class 412.

In one embodiment the development interface 300 provides a branch option 416, which enables a developer to branch to a sub-configuration of the currently displayed configuration, to surgically add customizations for the specific size class. A selector can be provided to enable the developer to select specific traits to customize and the configuration to which the edits are stored is determined based on the selected device of the concrete representation 401 and the properties and/or traits selected to customize.

For example, in the case a developer has selected a Tablet device in Portrait orientation and wishes to edit user interface constraints associated with the width and height properties of the user interface 302, the developer can select the branch option 416 in association with selecting the width and height traits to edit. As the developer is branching on both the width and height traits and the edits are for a Tablet device in portrait orientation, the branch mode creates a new sub-configuration, which in one embodiment is associated with the (Regular|Regular) size class, as determined based on the relationship shown in Table 1. In one embodiment the branch sub-configuration is determined based on the traits selected for branching, regardless of the specific traits that are customized once branch mode is entered. For example, when branching to the (Regular|Regular) size class, a developer can customize only the height constraint for the user interface, and the new height constraint is stored in (Regular|Regular). However, if a developer were to branch only on the width trait, the customizations performed in branch mode would be stored to (Regular|Any).

In one embodiment, once a sub-configuration is created for a trait, any further edits to the trait are stored in the sub-configuration, as the size class customizations are hierarchical on a per-property basis. In general, when edit of property X on object Y, the operational logic is configured to determine the configuration that is providing the value of the property currently shown in the development interface, for example, an abstract size classification associated with a concrete device and orientation. Once the configuration is determined, the operational logic can determine a sub-configuration to create, where the sub-configuration is determined based on the traits or properties selected for customization. The operational logic can then apply the values from the sub-configuration onto the initially determined configuration to determine a resolved configuration. For example and in one embodiment, if viewing a concrete device having a device configuration of (Regular|Regular), with a user interface customization in (Regular|Any), and while branching on a configuration resolved to (Any|Regular), edits performed are applied to a resolved configuration of (Regular|Regular).

While edits based on concrete representations of devices and resolved abstract size classes, embodiments can provide developer interfaces that enable editing of other properties and traits. In various embodiments, a user interface can be developed which varies over system provided traits including user interface idiom, which defines the overall type of user interface to which the application user interface to adapt. User interface idioms can include, but are not limited to a smartphone UI, a tablet UI, a television UI, and automobile UI. In one embodiment the user interface can be additionally configured to adapt based on a language direction (e.g., left-to-right or right-to-left). In one embodiment the user interface can be configured to adapt based on a preferred text category size (e.g. small system font, large system font, extra large, etc.). In one embodiment the user interface can be configured to adapt to a light or dark user interface style. In addition to width size class and height size class, in one embodiment the user interface can be configured to adapt to display scale. In one embodiment the user interface can be configured to adapt based on display device capability, such as whether the display supports a touchscreen having a three-dimensional (3D) touch capability and/or the display gamut of the display (e.g., sRGB or DCI-P3).

Figure 5A:
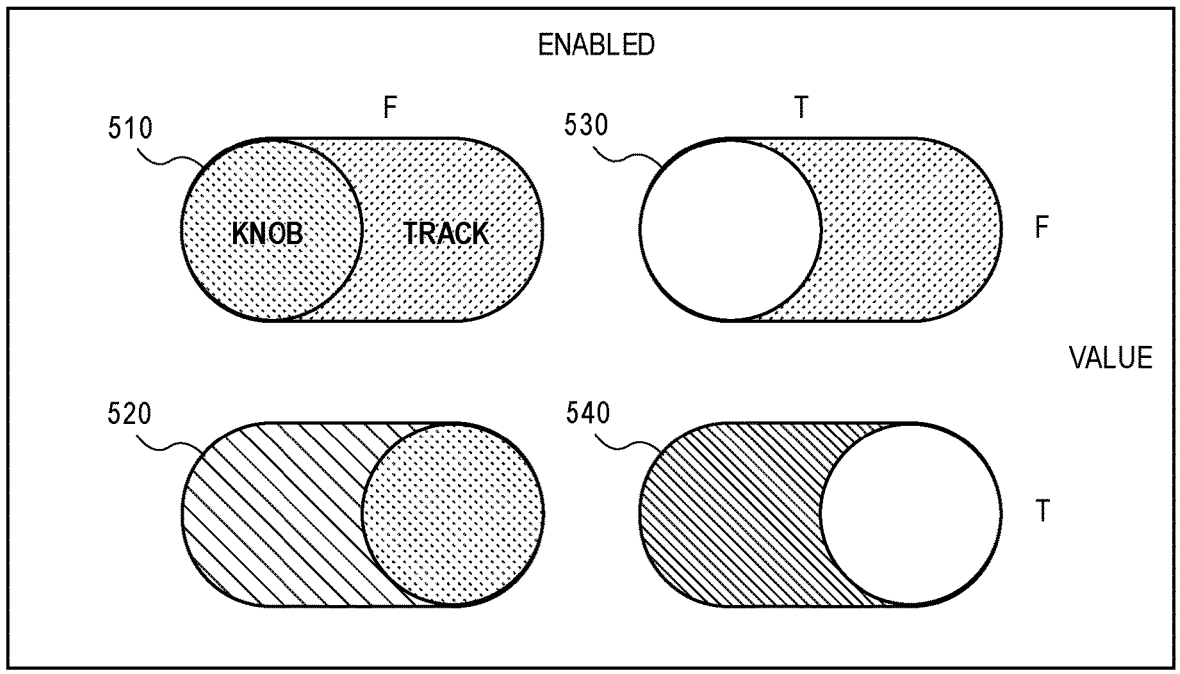
FIGS. 5A-5B illustrate concrete edits of a user interface slider and the underlying data associated with those edits.
Figure 5B:
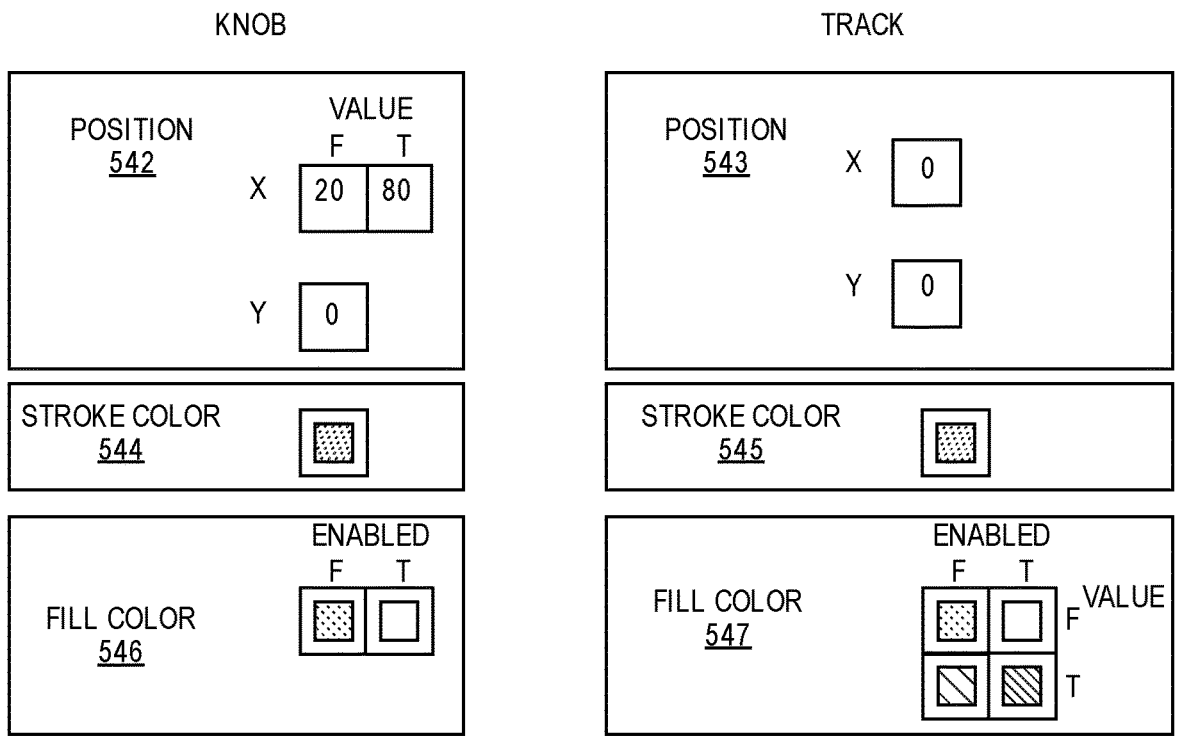

In one embodiment, a user interface can be designed that adapts based on user defined traits. FIGS. 5A-5B illustrate concrete edits of a user interface slider and the underlying data associated with those edits.

FIG. 5A illustrates an exemplary user interface element that can vary based on multiple traits. The exemplary user interface element is a slider having four possible states based on whether the slider is enabled or disabled and whether the slider value is True or False. Stating the slider state as a tuple of (Enabled|Value), the slider states are (False|False) 510, (False|True) 520, (True|False) 530, and (True|True) 540. Various traits for the knob and track elements of the slider can be defined for each slider state, such as knob position and color, as well as track position and color. The combination of values for the traits of each state defines a configuration for that state.

FIG. 5B shows the data associated with the configurations of the slider element. Instead of storing a complete set of data for each configuration, the configurations vary based only on the trait that is modified. For example, the knob position 542 data includes position data that varies on the X coordinate between false and true for the knob, but does not vary on the Y coordinate. As the slider does not move vertically when changing state, no sub-configurations exist for the Y coordinate of the knob position 542. Additionally, the track position 543 does not vary at all, so only one coordinate is used for all slider states and the coordinates do not include sub-configurations. Sub-configurations are also not used with stroke color knob stoke color 544 or track stroke color 545, as those values do not vary with the slider state. However, the knob fill color 546 varies based on whether the slider is enabled or disabled. Additionally, track fill color 547 has four sub-configurations that vary based on both enabled and value.

Figure 6:
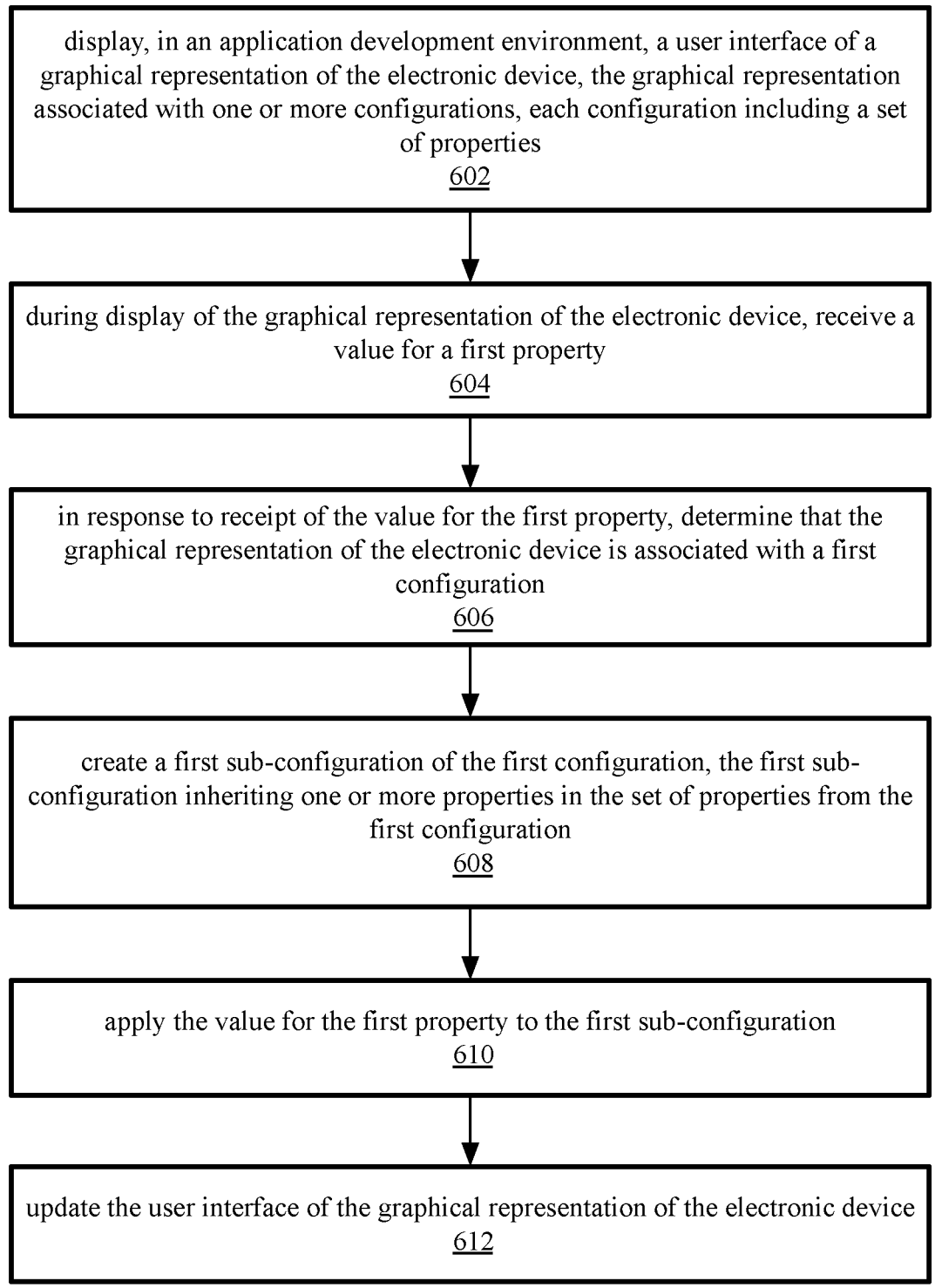
FIG. 6 if a flow diagram of adaptive user interface development logic, according to an embodiment.

FIG. 6 if a flow diagram of adaptive user interface development logic 600, according to an embodiment. The adaptive user interface logic 600 performs operations within a user interface development environment used to develop adaptive user interfaces.

In one embodiment, the adaptive user interface logic 600 can display, in an application development environment, a user interface of a graphical representation of the electronic device, the graphical representation associated with one or more configurations, each configuration including a set of properties, as shown at 602.

During display of the graphical representation of the electronic device, the adaptive user interface logic 600 can receive a value for a first property at 604. For example, the value can be received from a user, which can provide the value via the user interface of the application development environment.

In response to receipt of the value for the first property, the adaptive user interface logic 600 can determine that the graphical representation of the electronic device is associated with a first configuration, as shown at 606. The adaptive user interface logic 600 can then create a first sub-configuration of the first configuration, the first sub-configuration inheriting one or more properties in the set of properties from the first configuration at 608, and apply the value for the first property to the first sub-configuration at 610. The adaptive user interface logic 600 can then update the user interface of the graphical representation of the electronic device at 612.

FIG. 7 is flow diagram of additional adaptive user interface development logic 700, according to an embodiment. The additional adaptive user interface logic 700 can perform operations related to the branching edits to configurations, for example, as shown in FIG. 4.

In one embodiment the adaptive user interface development logic 700 can receive a user interface by an application development environment configured to enabling authoring of a user interface that adapts to a configuration associated with the electronic device, the configuration including a set of properties used to adapt the user interface, as shown at 702.

The adaptive user interface development logic 700 can further display a user interface on a graphical representation of the electronic device, the graphical representation associated with one or more configurations at 704. An interface developer, to customize the user interface can select an option to branch on one or more traits of the user interface. In response, the adaptive user interface development logic 700 can receive an indication to branch a first configuration associated with the graphical representation, the indication identifying a property of the first configuration to be customized at 706

In response to the indication, the adaptive user interface development logic 700 can create a first sub-configuration of the first configuration, the first sub-configuration inheriting one or more properties in the set of properties from the first configuration at 708. The sub-configuration can be a branch performed from a property hierarchy associated with the configuration associated with the graphical representation of the electronic device.

In one embodiment, during the branch to the sub-configuration, the adaptive user interface development logic 700 can receive a value for the property of the first configuration to be customized at 710, and apply the value for the property to the first sub-configuration at 712. The adaptive user interface development logic 700 can then update the user interface of the graphical representation of the electronic device at 714.

FIG. 8 is a flow diagram of a further embodiment of adaptive user interface development logic 800. The adaptive user interface development logic 800 can be used by an interface development environment to create a user interface of an application that can adapt at runtime based on a device type, device size, or device orientation.

In one embodiment the adaptive user interface development logic 800, can receive a user interface by an application development environment, the application development environment enabling authoring of a user interface that adapts to a configuration associated with the electronic device, the configuration including a set of properties used to adapt the user interface at shown at 802. The adaptive user interface development logic 800 can create an application including the user interface, where the application is configured to determine the configuration associated with an electronic device, adapt the user interface according to the set of properties included in the configuration, and display the adapted user interface on the electronic device, as shown at 804.

Figure 9:
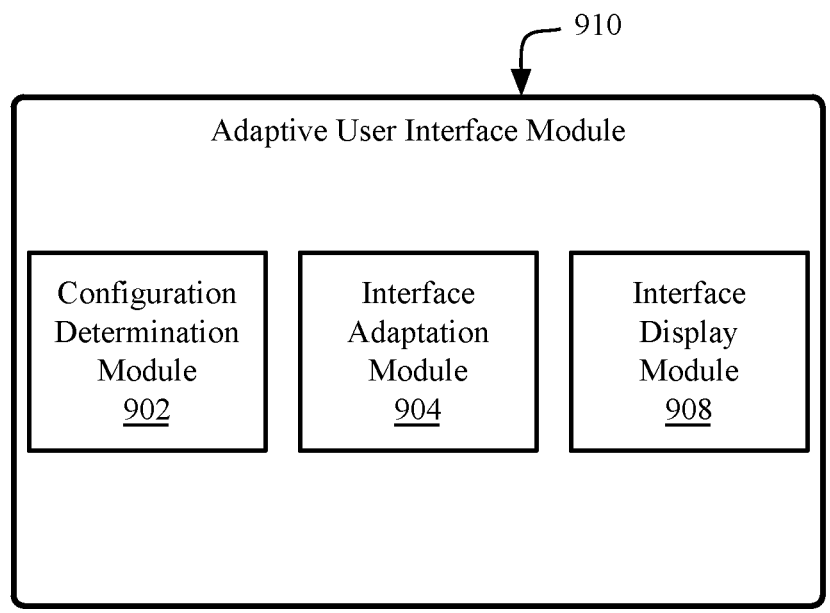
FIG. 9 is a block diagram of an adaptive user interface system, according to an embodiment.

FIG. 9 is a block diagram of an adaptive user interface system 900, according to an embodiment. In one embodiment the adaptive user interface system 900 includes an adaptive user interface module 910. The adaptive user interface module 910 can be used to enable a user interface to adapt based on a change in configuration, for example, when a device changes orientation, or to adapt an application interface for an application that can be installed on different types or sizes of devices. The adaptive user interface module 910 can include a configuration determination module 902, an interface adaptation module 904, and an interface display module 908.

In one embodiment the configuration determination module 902 can be configured to determine the configuration associated with an electronic device. The interface adaptation module 904 can be configured to adapt the user interface according to the set of properties included in the configuration. The interface display module can be configured to display the adapted user interface on the electronic device.

In one embodiment the adaptive user interface system 900 can performs automatic adaptation by computing a final position and size of a user interface element from its properties, including a set of constraints. The constraints are a collection of relative relationships expressed as linear equations. For example, a developer can define the constraints: View.right=Container.right−20, View.top=Container.top+20, View.width=100, and View.height=100. If container is 500×500 (in points), then View's final position (assuming a flipped coordinate system) would be: x=500−100−20=380, y=0+20=20, width=100, and height=100. This example is only illustrative and those of ordinary skill in the art will recognize other automatic user interface adaptations that can work as well. In this example, the constraints can be traits or properties that are edited in view of a concrete representation of a device, as in FIG. 3 and FIG. 4. The collection of properties (e.g., configurations and sub-configurations) to which the constraints are stored can be determined based on the logic provided by embodiments described herein.

Figure 10:
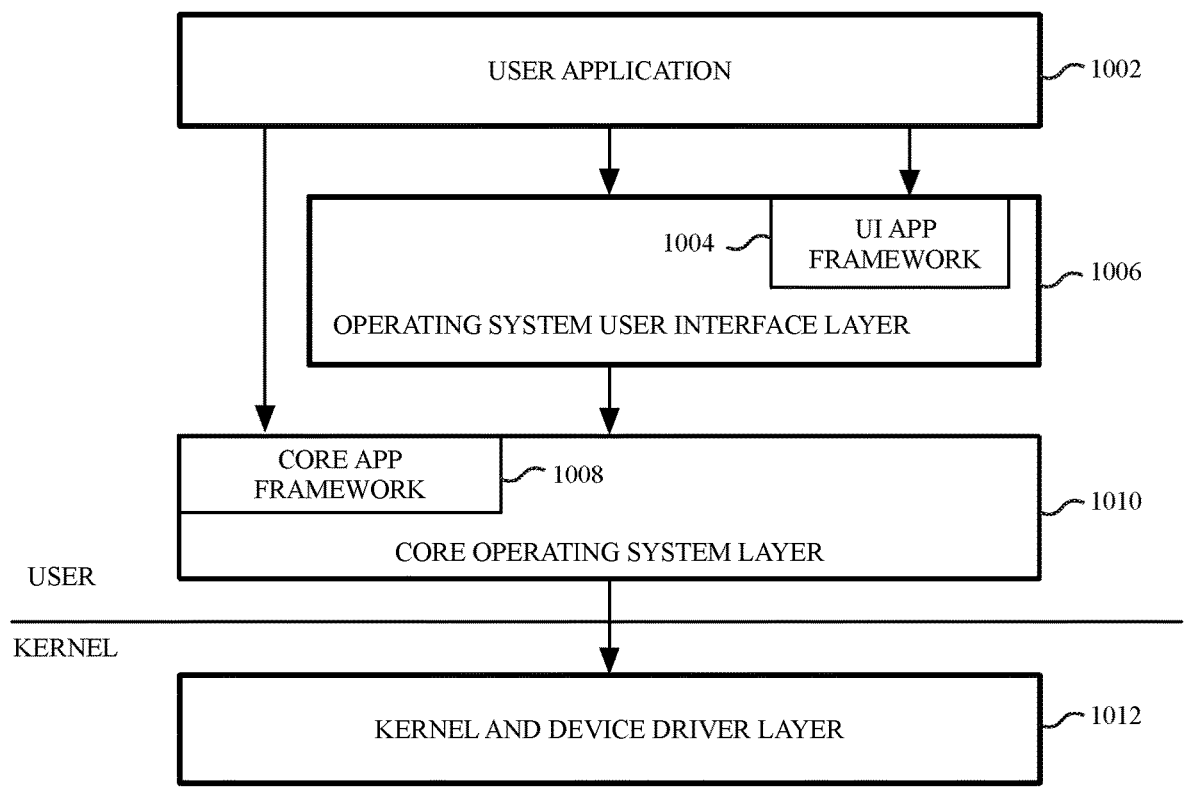
FIG. 10 is a block diagram illustrating a multi-layer software architecture used by a data processing system, according to an embodiment.

FIG. 10 is a block diagram illustrating a multi-layer software architecture 1000 used by a data processing system, according to an embodiment. The software components are illustrated with a division between user space and a kernel space. Although other arrangements are possible, user applications (e.g., user application 1002), and some operating system components (e.g., operating system user interface layer 1006, and the core operating system layer 1010)

execute in user space. In kernel space, the operating system kernel and a set of device drivers operate in the kernel and device driver layer 1012. The kernel and device driver layer 1012 manage the underlying functionality of the overall operating system and provide a formalized and secure mechanism for user space software to access data processing system hardware.

A user interface (UI) application framework 1004 provides a mechanism for the user application 1002 to access UI services provided by the operating system (OS) UI layer 1006. Underlying operating system functions that are not related to the user interface can be performed in the core operating system layer 1010. One or more data management frameworks, such as a core app framework 1008 can be made available to a user application to facilitate access to operating system functions.

The exemplary user application 1002 may be any one of a plurality of user applications. Each user application 1002 can include one or more processes or tasks, which may spawn multiple threads. The user application 1002 can access instructions in an exemplary UI app framework 1004 for creating and drawing graphical user interface objects such as icons, buttons, windows, dialogs, controls, menus, and other user interface elements. The UI application framework 1004 also provides additional functionality including menu management, window management, and document management, as well as file open and save dialogs, drag-and-drop, and copy-and-paste handling.

The core operating system layer 1010 contains operating system components that implement features including and related to application security, system configuration, graphics and media hardware acceleration, and directory services. Multiple application frameworks, including the core app framework 1008, provide a set of APIs to enable a user application 1002 to access core services that are essential to the application, but are not directly related to the user interface of the application. The core app framework 1008 can facilitate an application's access to database services, credential and security services, backup services, data synchronization services, and other underlying functionality that may be useful to an application.

The core app framework 1008, or equivalent application frameworks, can provide access to remote server based storage for functionality including synchronized document storage, key-value storage, and database services. Key-value storage allows a user application 1002 to share small amounts of data such as user preferences or bookmarks among multiple instances of the user application 1002 across multiple client devices. The user application 1002 can also access server-based, multi-device database solutions via the core app framework 1008.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 11:
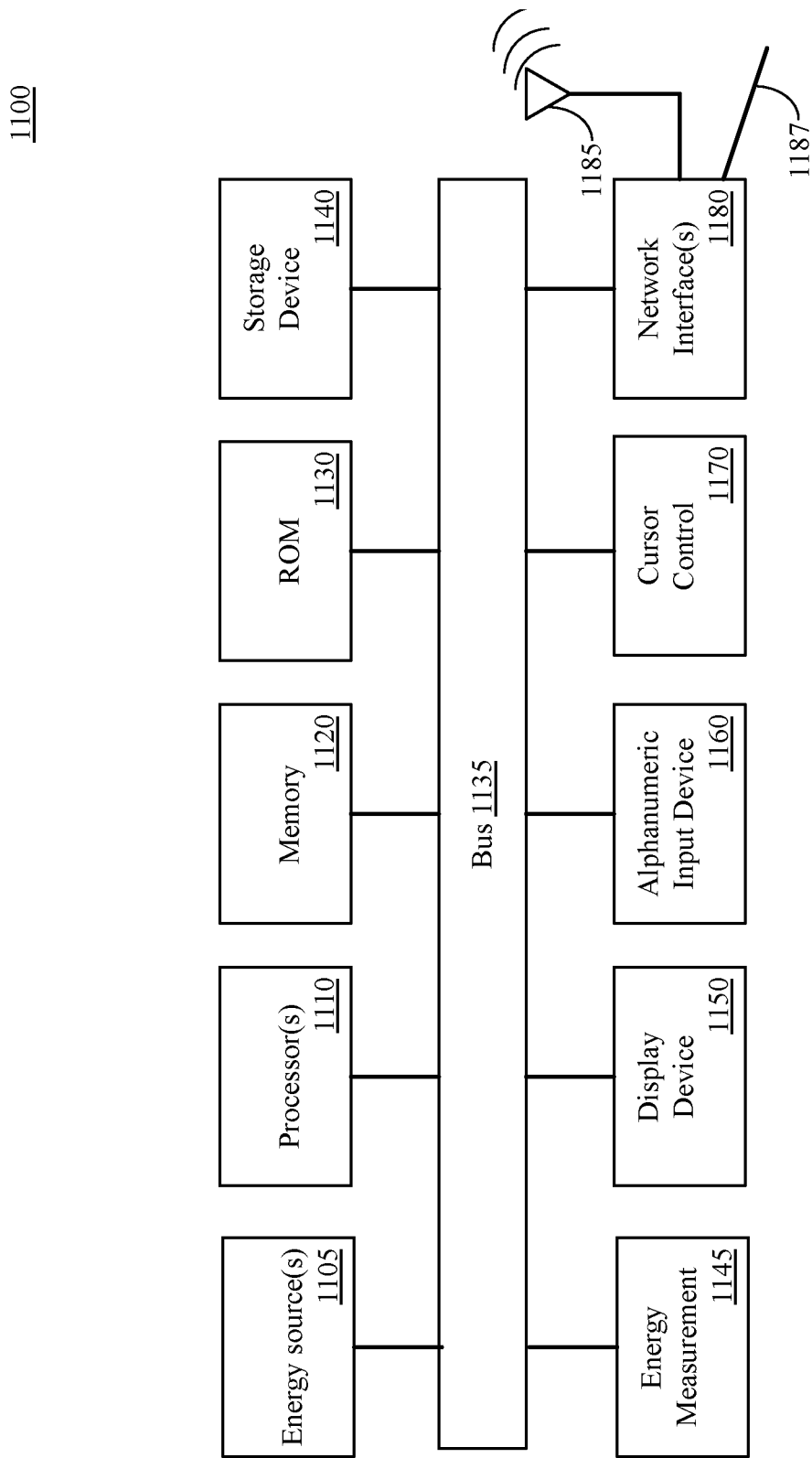
FIG. 11 is a block diagram of one embodiment of a computing system.

FIG. 11 is a block diagram of one embodiment of a computing system 1100. The computing system illustrated in FIG. 11 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 11 may be used to provide the computing device and/or the server device.

Computing system 1100 includes bus 1135 or other communication device to communicate information, and processor(s) 1110 coupled to bus 1135 that may process information.

While computing system 1100 is illustrated with a single processor, computing system 1100 may include multiple processors 1110, including one or more co-processors. Computing system 1100 further may include main memory 1120 in the form of random access memory (RAM) or other dynamic storage device coupled to bus 1135 and may store information and instructions that may be executed by processor(s) 1110. Main memory 1120 may also be used to store temporary variables or other intermediate information during execution of instructions by processor(s) 1110.

Computing system 1100 may also include read only memory (ROM) 1130 and/or another data storage device 1140 coupled to bus 1135, which can store data and instructions for use by the processor(s) 1110. Data storage device 1140 may be coupled to bus 1135 to store information and instructions. Data storage device 1140 such as flash memory or a magnetic disk or optical disc and corresponding drive may be coupled to computing system 1100.

Computing system 1100 may also be coupled via bus 1135 to display device 1150, such as a cathode ray tube (CRT), a liquid crystal display (LCD), or a light emitting diode (LED) display, to display information to a user. Computing system 1100 can also include an alphanumeric input device 1160, including alphanumeric and other keys, which may be coupled to bus 1135 to communicate information and command selections to processor(s) 1110. Another type of user input device is cursor control 1170, such as a touchpad, a mouse, a trackball, or cursor direction keys to communicate direction information and command selections to processor(s) 1110 and to control cursor movement on display device 1150. Computing system 1100 may also receive user input from a remote device that is communicatively coupled to computing system 1100 via one or more network interface(s) 1180.

Computing system 1100 further may include one or more network interface(s) 1180 to provide access to a network, such as a local area network. Network interface(s) 1180 may include, for example, a wireless network interface having antenna 1185, which may represent one or more antenna(e). Computing system 1100 can include multiple wireless network interfaces such as a combination of WiFi, Bluetooth®, near field communication (NFC), and/or cellular telephony interfaces. Network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, network interface(s) 1180 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

Computing system 1100 can further include one or more energy sources 1105 and an one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, WiFi subsystem, or other frequently-used or high consumption subsystem.

Figure 12:
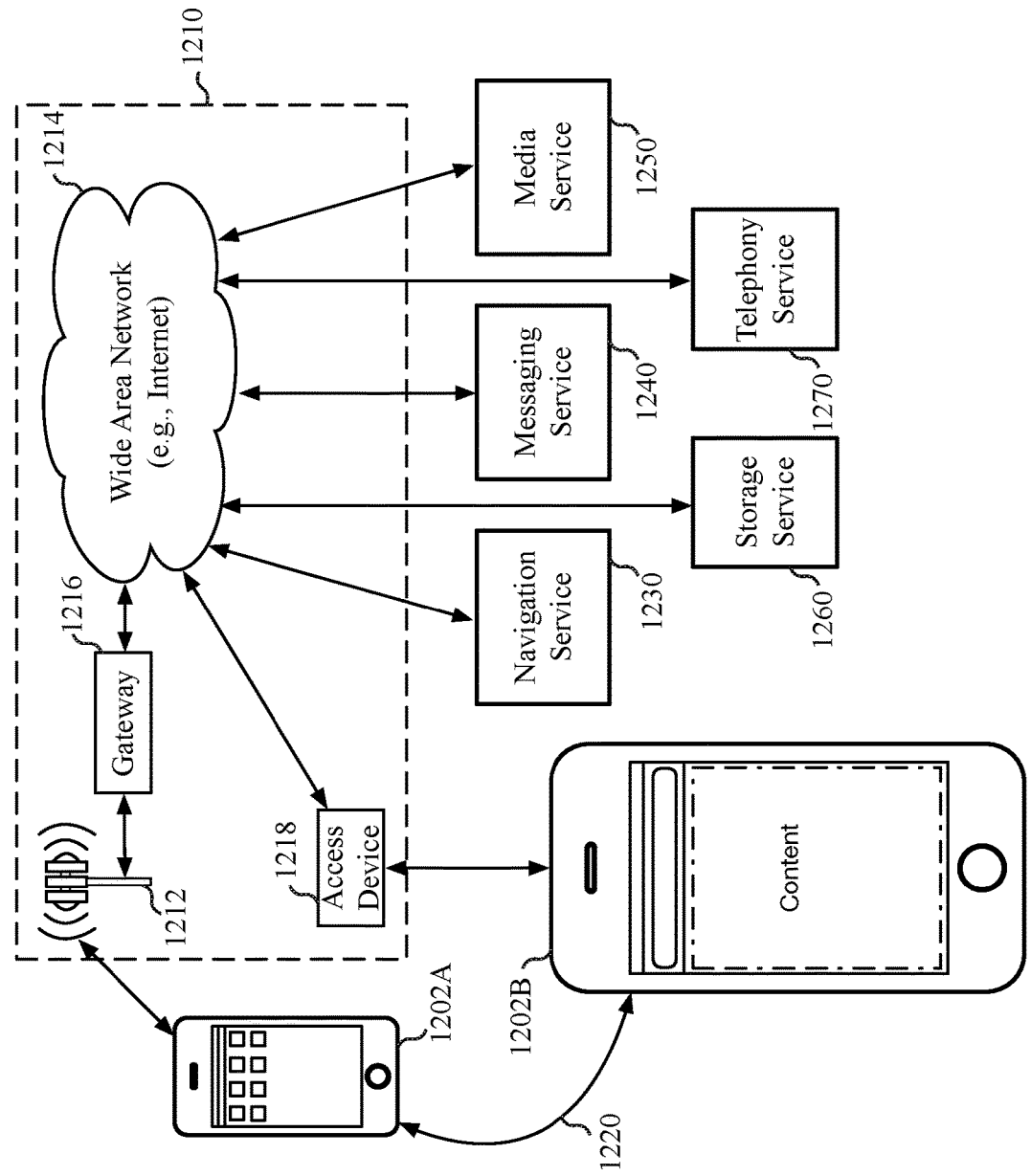
FIG. 12 is a block diagram of an example network operating environment for mobile devices, according to an embodiment.

FIG. 12 is a block diagram of an example network operating environment 1200 for mobile devices, according to an embodiment. Mobile device 1202A and mobile device 1202B can, for example, communicate 1220 over one or more wired and/or wireless networks 1210 to perform data communication. For example, a wireless network 1212, e.g., a cellular network, can communicate with a wide area network 1214, such as the Internet, by use of a gateway 1216. Likewise, an access device 1218, such as a mobile hotspot wireless access device, can provide communication access to the wide area network 1214.

In some implementations, both voice and data communications can be established over the wireless network 1212 and/or the access device 1218. For example, mobile device 1202A can place and receive phone calls (e.g., using VoIP protocols), send and receive e-mail messages (e.g., using POPS protocol), and retrieve electronic documents and/or streams, such as web pages, photographs, and videos, over the wireless network 1212, gateway 1216, and wide area network 1214 (e.g., using TCP/IP or UDP protocols). In some implementations, mobile device 1202A can place and receive phone calls, send and receive e-mail messages, and retrieve electronic documents over the access device 1218 and the wide area network 1214. In some implementations, mobile device 1202A or mobile device 1202B can be physically connected to the access device 1218 using one or more cables and the access device 1218 can be a personal computer. In this configuration, mobile device 1202A or mobile device 1202B can be referred to as a "tethered" device.

Mobile device 1202A or mobile device 1202B can communicate with one or more services, such as a navigation service 1230, a messaging service 1240, a media service 1250, a storage service 1260, and a telephony service 1270 over the one or more wired and/or wireless networks 1210. For example, the navigation service 1230 can provide navigation information, e.g., map information, location information, route information, and other information. The messaging service 1240 can, for example, provide e-mail and/or other messaging services. The media service 1250 can, for example, provide access to media files, such as song files, audio books, movie files, video clips, and other media data. A storage service 1260 can provide network storage capabilities to mobile device 1202A and mobile device 1202B to store documents and media files. A telephony service 1270 can enable telephonic communication between mobile device 1202A and mobile device 1202B, or between a mobile device and a wired telephonic device. The telephony service 1270 can route voice over IP (VoIP) calls over the wide area network 1214 or can access a cellular voice network (e.g., wireless network 1212). Other services can also be provided, including a software update service to update operating system software or client software on the mobile devices.

Mobile device 1202A or 1202B can also access other data and content over the one or more wired and/or wireless networks 1210. For example, content publishers, such as news sites, RSS feeds, web sites, blogs, social networking sites, developer networks, etc., can be accessed via a web browser as described herein. For example, mobile device 1202A and/or mobile device 1202B can execute browser software to access web sites provided by servers accessible via the wide area network 1214.

Figure 13:
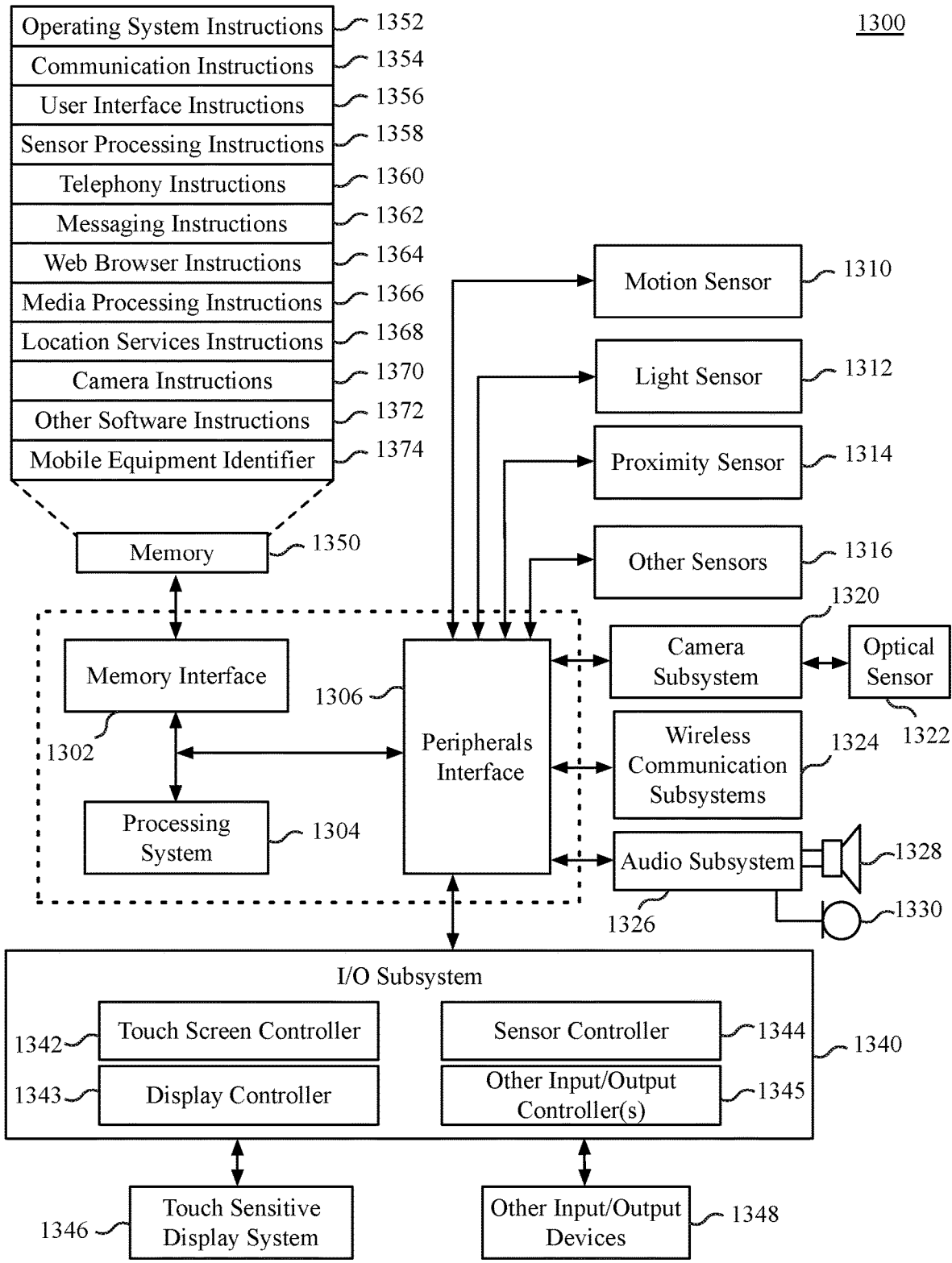
FIG. 13 is a block diagram of mobile device architecture, according to an embodiment.

FIG. 13 is a block diagram of mobile device architecture 1300, according to an embodiment. The mobile device architecture 1300 includes a include a memory interface 1302, a processing system 1304 including one or more data processors, image processors and/or graphics processing units, and a peripherals interface 1306. The various components can be coupled by one or more communication buses or signal lines. The various components can be separate logical components or devices or can be integrated in one or more integrated circuits, such as in a system on a chip integrated circuit.

The memory interface 1302 can be coupled to memory 1350, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate the mobile device functionality. Other sensors 1316 can also be connected to the peripherals interface 1306, such as a positioning system (e.g., GPS receiver), a temperature sensor, a biometric sensor, or other sensing device, to facilitate related functionalities. A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1324, which can include radio frequency receivers and transmitters and/or optical (e.g., infrared) receivers and transmitters. The specific design and implementation of the wireless communication subsystems 1324 can depend on the communication network(s) over which a mobile device is intended to operate. For example, a mobile device including the illustrated mobile device architecture 1300 can include wireless communication subsystems 1324 designed to operate over a GSM network, a CDMA network, an LTE network, a Wi-Fi network, a Bluetooth network, or any other wireless network. In particular, the wireless communication subsystems 1324 can provide a communications mechanism over which a client browser application can retrieve resources from a remote web server.

An audio subsystem 1326 can be coupled to a speaker 1328 and a microphone 1330 to facilitate voice-enabled functions, such as voice recognition, voice replication, digital recording, and telephony functions.

The I/O subsystem 1340 can include a touch screen controller 1342 and/or other input controller(s) 1345. The touch screen controller 1342 can be coupled to a touch sensitive display system 1346 (touch-screen). The touch sensitive display system 1346 and touch screen controller 1342 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1346. Display output for the touch sensitive display system 1346 can be generated by a display controller 1343. In one embodiment the display controller 1343 can provide frame data to the touch sensitive display system 1346 at a variable frame rate.

In one embodiment a sensor controller 1344 is included to monitor, control, and/or processes data received from one or more of the motion sensor 1310, light sensor 1312, proximity sensor 1314, or other sensors 1316. The sensor controller 1344 can include logic to interpret sensor data to determine the occurrence of one of more motion events or activities by analysis of the sensor data from the sensors.

In one embodiment the I/O subsystem 1340 includes other input controller(s) 1345 that can be coupled to other input/control devices 1348, such as one or more buttons, rocker switches, thumb-wheel, infrared port, USB port, and/or a pointer device such as a stylus, or control devices such as an up/down button for volume control of the speaker 1328 and/or the microphone 1330.

In one embodiment, the memory 1350 coupled to the memory interface 1302 can store instructions for an operating system 1352, including portable operating system interface (POSIX) compliant and non-compliant operating system or an embedded operating system. The operating system 1352 may include instructions for handling basic system services and for performing hardware dependent tasks. In some implementations, the operating system 1352 can be a kernel.

The memory 1350 can also store communication instructions 1354 to facilitate communicating with one or more additional devices, one or more computers and/or one or more servers, for example, to retrieve web resources from remote web servers. The memory 1350 can also include user interface instructions 1356, including graphical user interface instructions to facilitate graphic user interface processing.

Additionally, the memory 1350 can store sensor processing instructions 1358 to facilitate sensor-related processing and functions; telephony instructions 1360 to facilitate telephone-related processes and functions; messaging instructions 1362 to facilitate electronic-messaging related processes and functions; web browser instructions 1364 to facilitate web browsing-related processes and functions; media processing instructions 1366 to facilitate media processing-related processes and functions; location services instructions including GPS and/or navigation instructions 1368 and Wi-Fi based location instructions to facilitate location based functionality; camera instructions 1370 to facilitate camera-related processes and functions; and/or other software instructions 1372 to facilitate other processes and functions, e.g., security processes and functions, and processes and functions related to the systems. The memory 1350 may also store other software instructions such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively. A mobile equipment identifier, such as an International Mobile Equipment Identity (IMEI) 1374 or a similar hardware identifier can also be stored in memory 1350.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions may be implemented in hardware and/or in software, including in one or more signal processing and/or application specific integrated circuits.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Various embodiments and aspects of a development environment for developing an adaptive user interface for an application configured to execute on an electronic device. One embodiment defines a process and associated logic within an interface development environment for selecting a device and illustrating a user interface within a design canvas of the development environment. The user interface can correspond to the selected device and data from within an inherited sub-configuration that matches the selected device. A computing device of a first type, a first size (e.g., medium sized table computer) can be selected and displayed such that the user interface experience is based on a regular and unconstrained width and height (e.g., Regular|Regular). Properties used to display the user interface can be applied in order of abstract to specific. For example, values associated with the any width and any height (Any|Any) configuration, the regular width, any height (Regular|Any) configuration, then the any width, regular height configuration (Any|Regular), and finally with highest precedence, from the regular width, Regular height (Regular|Regular) configuration.

One embodiment provides for a process and associated logic for introducing variations within the configuration for one or more properties and/or traits associated with a user interface. A developer can enter a variation (e.g., branch) mode by selecting specific traits on which to vary. A change can then be made to a property of the trait. For each change, an origin configuration is determined for a value of the property and a determination is made as to whether the configuration is more specific or less specific (e.g., more abstract) than the configuration on which the trait variation is to occur. If the configuration is more specific (e.g., has a greater number of constraints), the configuration can be updated with the new value. If the existing value of the property is from a configuration that is less specific than the branch configuration, a new variation can be introduced for the single property on the single object for the branched configuration.

For example, edits can be made to a user interface associated with a concrete representation of a specific smartphone device, for example, a smartphone device having size class associated with a compact width, regular height (Compact|Regular) configuration. When editing a value of a property associated with user interface element (e.g., the title of a button), the edit can be performed while varying over a width trait (e.g., branch on width), which resolves to a configuration associated with compact width, any height (Compact|Any). The configuration in which the new title of the button is stored can depend on the origin configuration of the previous title. If the previous title is derived from the (Any|Any) configuration, and the resolved configuration for the edit is (Compact|Any), then the new title is stored in (Compact|Any). If the previous title is derived from the (Compact|Regular) configuration, then the edit is stored in (Compact|Regular) as that configuration is more specific than (Compact|Any).

One embodiment provides for an electronic device and associated data processing system in which a user interface for application can be developed, such that the user interface is an adaptive user interface as described herein, such that the adaptive user interface can determine the configuration associated with an electronic device, adapt the user interface according to the set of properties included in the configuration, and display the adapted user interface on the electronic device.

In the foregoing specification, the invention has been described with reference to specific embodiments thereof. Those skilled in the art will appreciate from the foregoing description that the broad techniques of the embodiments can be implemented in a variety of forms and various modifications and changes can be made thereto without departing from the broader spirit and scope of the invention. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A non-transitory computer-readable medium storing instructions which, when executed by one or more processors, cause the one or more processors to perform operations to create an adaptive user interface for an electronic device, the operations comprising:
    displaying, in an application development environment, a user interface of a graphical representation of the electronic device, the graphical representation associated with one or more configurations, each configuration including a set of properties and each configuration associated with a size class of the electronic device, the size class defining a width and height of a display, of the electronic device, to display the user interface of the graphical representation of the electronic device, the size class of the electronic device selected from a parent size class of any width and any height of the display and one or more child size classes of the parent size class, each child size class having a display width or display height which is different than the parent size class of any width and any height;
    while displaying the graphical representation of the electronic device, receiving a value for a first property;
    in response to receiving the value for a first property, determining that the graphical representation of the electronic device is associated with a first configuration;
    creating a first sub-configuration of the first configuration, the first sub-configuration inheriting one or more properties in the set of properties from the first configuration;
    applying the value for the first property to the first sub-configuration; and
    updating the user interface of the graphical representation of the electronic device.

2. The non-transitory computer-readable medium as in claim 1, wherein applying the value for the first property to the first configuration includes adding a first customization to the first sub-configuration, the first customization absent from the first configuration.

3. The non-transitory computer-readable medium as in claim 1, wherein the graphical representation of the electronic device is a concrete and non-abstracted representation of at least the display of the electronic device.

4. The non-transitory computer-readable medium as in claim 3, wherein the electronic device is one of multiple classes of electronic devices and the graphical representation of the electronic device is configurable to display an electronic device from any of the multiple classes of electronic devices.

5. The non-transitory computer-readable medium as in claim 4, wherein
    determining that the graphical representation of the electronic device is associated with a first configuration includes:
        determining that the graphical representation of the electronic device is a representation of a first class of electronic device;
        determining a set of configurations associated with the first class of electronic device, the set of configurations including the first configuration;
        selecting the first configuration from the set of configurations based on a trait of the first class of electronic device.

6. The non-transitory computer-readable medium as in claim 5, wherein the first class of electronic device is one of a first smartphone device, a second smartphone device, a first mobile tablet device, and a second mobile tablet device.

7. The non-transitory computer-readable medium as in claim 5, wherein the trait of the first class of electronic device is one of a configurable trait or an immutable trait.

8. The non-transitory computer-readable medium as in claim 7, wherein the configurable trait includes a configured orientation of the first class of electronic device and the configured orientation is one of portrait orientation or a landscape orientation.

9. The non-transitory computer-readable medium as in claim 8, wherein the immutable trait includes a color gamut of a display of the first class of electronic device.

10. The non-transitory computer-readable medium as in claim 9, wherein the set of properties includes at least one of a width property, a height property, or a color property.

11. A non-transitory computer-readable medium storing instructions which, when executed by one or more processors, cause the one or more processors to perform operations to create an adaptive user interface for an electronic device, the operations comprising:

receiving a user interface by an application development environment, the application development environment enabling authoring of a user interface that adapts to a configuration associated with the electronic device, the configuration including a set of properties used to adapt the user interface;

displaying the user interface on a graphical representation of the electronic device, the graphical representation associated with one or more configurations, each configuration associated with a size class of the electronic device, the size class defining a width and height of a display, of the electronic device, to display the user interface of the graphical representation of the electronic device, the size class of the electronic device selected from a parent size class of any width and any height of the display and one or more child size classes of the parent size class, each child size class having a display width or display height which is different than the parent size class of any width and any height;

receiving an indication to branch a first configuration associated with the graphical representation, the indication identifying a property of the first configuration to be customized;

creating a first sub-configuration of the first configuration, the first sub-configuration inheriting one or more properties in the set of properties from the first configuration;

receiving a value for the property of the first configuration to be customized; applying the value for the property to the first sub-configuration; and updating the user interface of the graphical representation of the electronic device.

12. The non-transitory computer-readable medium as in claim 11, additionally comprising:

entering a branch mode in response to receiving the indication to branch the first configuration;

applying one or more customizations to the first sub-configuration of the first configuration; and exiting the branch mode in response to receiving an indication that customization of sub-configuration is complete.

13. The non-transitory computer-readable medium as in claim 12, after receiving the indication to branch the first configuration, additionally comprising:

creating the first sub-configuration of the first configuration in response to the indication identifying a first property of the first configuration; and creating a second sub-configuration of the first configuration in response to the indication identifying a second property of the first configuration.

14. The non-transitory computer-readable medium as in claim 13, additionally comprising:

creating a third sub-configuration of the first configuration in response to the indication identifying the first property and the second property.

15. The non-transitory computer-readable medium as in claim 14, additionally comprising:

receiving an edit to a value of one or more of the first property or the second property;

editing the value of the first property in the first sub-configuration in response to receiving an edit to the first property;

editing the value of the second property in the second sub-configuration in response to receiving an edit to the second property; and editing the value of the first property or the second property in the third sub-configuration in response to receiving an edit to the second property or a third property.

16. A data processing system comprising:

one or more non-transitory machine-readable media to store instructions;

one or more processors to execute the instructions, the instructions to cause the one or more processors to:

receive a user interface by an application development environment, the application development environment to enable authoring of a user interface that adapts to a configuration associated with an electronic device, the configuration including a set of properties used to adapt the user interface, the configuration associated with a size class of the electronic device, the size class defining a width and height of a display, of the electronic device, to display the user interface of a graphical representation of the electronic device, the size class of the electronic device selected from a parent size class of any width and any height of the display and one or more child size classes of the parent size class, each child size class having a display width or display height which is different than the parent size class of any width and any height;

create an application including the user interface wherein the application is configured to: determine the configuration associated with an electronic device;

adapt the user interface according to the set of properties included in the configuration; and display an adapted user interface on the electronic device.

17. The data processing system as in claim 16, wherein the user interface is configured to adapt the user interface according to the set of properties included in a first sub-configuration of the configuration.

18. The data processing system as in claim 17, wherein the set of properties includes at least one of a width property, a height property, or a color property.

19. The data processing system as in claim 17, the application additionally configured to adapt the user interface according to a set of traits of the electronic device, the set of traits including a type of user interface associated with the electronic device, the type of user interface including a smartphone interface, a tablet interface, a television interface, and an automobile interface.

20. The data processing system as in claim 19, the set of traits additionally including a language direction of an interface, a preferred system font size of the interface, or a user interface style associated with the interface, wherein the user interface style includes one of a light style or a dark style.

21. The data processing system as in claim 20, the set of traits additionally including one or more of a width size class or a height size class for a display of the electronic device.

22. The data processing system as in claim 21, the set of traits additionally including a scale of the display of the electronic device.

23. The data processing system as in claim 22, the set of traits additionally a capability associated with the display of the electronic device, the capability including one or more of a color gamut for the display of the electronic device or a touch screen capability associated with the display of the electronic device.

* * * * *